United States Patent
Ho (10) Patent No.: US 9,153,868 B2
(45) Date of Patent: Oct. 6, 2015

(54) WIRELESS ELECTRONIC DEVICE AND WIRELESS TRANSMISSION METHOD THEREOF

(71) Applicant: Wistron NeWeb Corp., Hsinchu (TW)

(72) Inventor: Yung-Fa Ho, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 30 days.

(21) Appl. No.: 14/253,066

(22) Filed: Apr. 15, 2014

(65) Prior Publication Data

US 2015/0155626 A1    Jun. 4, 2015

(30) Foreign Application Priority Data

Nov. 29, 2013    (TW) .............. 102143704 A (51) Int. Cl.
*H01Q 3/26* (2006.01)
*H04W 24/02* (2009.01)

(52) U.S. Cl.
CPC ............. *H01Q 3/2605* (2013.01); *H04W 24/02* (2013.01)

(58) Field of Classification Search
CPC ........................ H01Q 3/2605; H04W 24/02
See application file for complete search history.

(56) References Cited

U.S. PATENT DOCUMENTS

| 8,155,096 | B1* | 4/2012 | Proctor, Jr. ................ 370/342 |
| 2007/0141997 | A1 | 6/2007 | Wulff et al. | |
| 2007/0254597 | A1* | 11/2007 | Li et al. .................... 455/69 |
| 2009/0047910 | A1* | 2/2009 | Niu et al. .................. 455/68 |
| 2013/0286991 | A1* | 10/2013 | Yang et al. ................ 370/329 |

FOREIGN PATENT DOCUMENTS

| CN | 101084666 A | 12/2007 |
| TW | 200516889 A | 5/2005 |

* cited by examiner

*Primary Examiner* — David Bilodeau
(74) *Attorney, Agent, or Firm* — Muncy, Geissler, Olds & Lowe, P.C.

(57) ABSTRACT

The present invention provides a wireless electronic device including an adaptive antenna unit and a processing unit. The adaptive antenna unit directionally receives data from a first electronic device. The processing unit estimates a feedback time for when the wireless electronic device may receive data from the first electronic device when a predetermined condition is met, and enables the adaptive antenna unit to form a specific radiation field in a specific direction to receive data through the specific radiation field after the feedback time.

22 Claims, 4 Drawing Sheets

WIRELESS ELECTRONIC DEVICE AND WIRELESS TRANSMISSION METHOD THEREOF

CROSS REFERENCE TO RELATED APPLICATIONS

This application claims priority of Taiwan Patent Application No. 102143704, filed on Nov. 29, 2013, the entirety of which is incorporated by reference herein.

BACKGROUND OF THE INVENTION

1. Field of the Invention

The present invention is related to a wireless electronic device; and in particular to a wireless transmission method capable of receiving data directionally.

2. Description of the Related Art

In recent years, electronic devices have become much higher-end and their functions have also increased in variety. For example, notebooks, cellphones, tablets and other handheld devices can have telecommunication capabilities, receiving and sending emails, maintaining social networks, managing contacts, media playback, and many other functions and applications.

Currently, many types of portable communications equipment can transfer information using wired and wireless internet connections. In the field of wireless communication systems, the next generation aims to research and develop a more efficient data transfer system. To increase the efficiency of wireless equipment and systems that transfer communications data, there needs to be a better mechanism to execute wireless communication; to create a better network environment.

BRIEF SUMMARY OF THE INVENTION

A detailed description is given in the following embodiments with reference to the accompanying drawings.

The present invention provides a wireless electronic device. The wireless electronic device includes an adaptive antenna unit and a processing unit. The adaptive antenna unit is arranged to directionally receive data from a first electronic device. The processing unit is arranged to estimate a feedback time for when the wireless electronic device may receive data from the first electronic device when a predetermined condition is met, and enable the adaptive antenna unit to form a specific radiation field on a specific direction to receive data through the specific radiation field after the feedback time.

The present invention further provides a wireless transmission method applied to an adaptive antenna unit of a wireless electronic device, wherein the adaptive antenna unit is arranged to directionally receive data from a first electronic device. The wireless transmission method includes: determining whether a predetermined condition is met; estimating a feedback time for when the wireless electronic device may receive data from the first electronic device when the predetermined condition is met; and enabling the adaptive antenna unit to form a specific radiation field on a specific direction to receive data through the specific radiation field after the feedback time.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
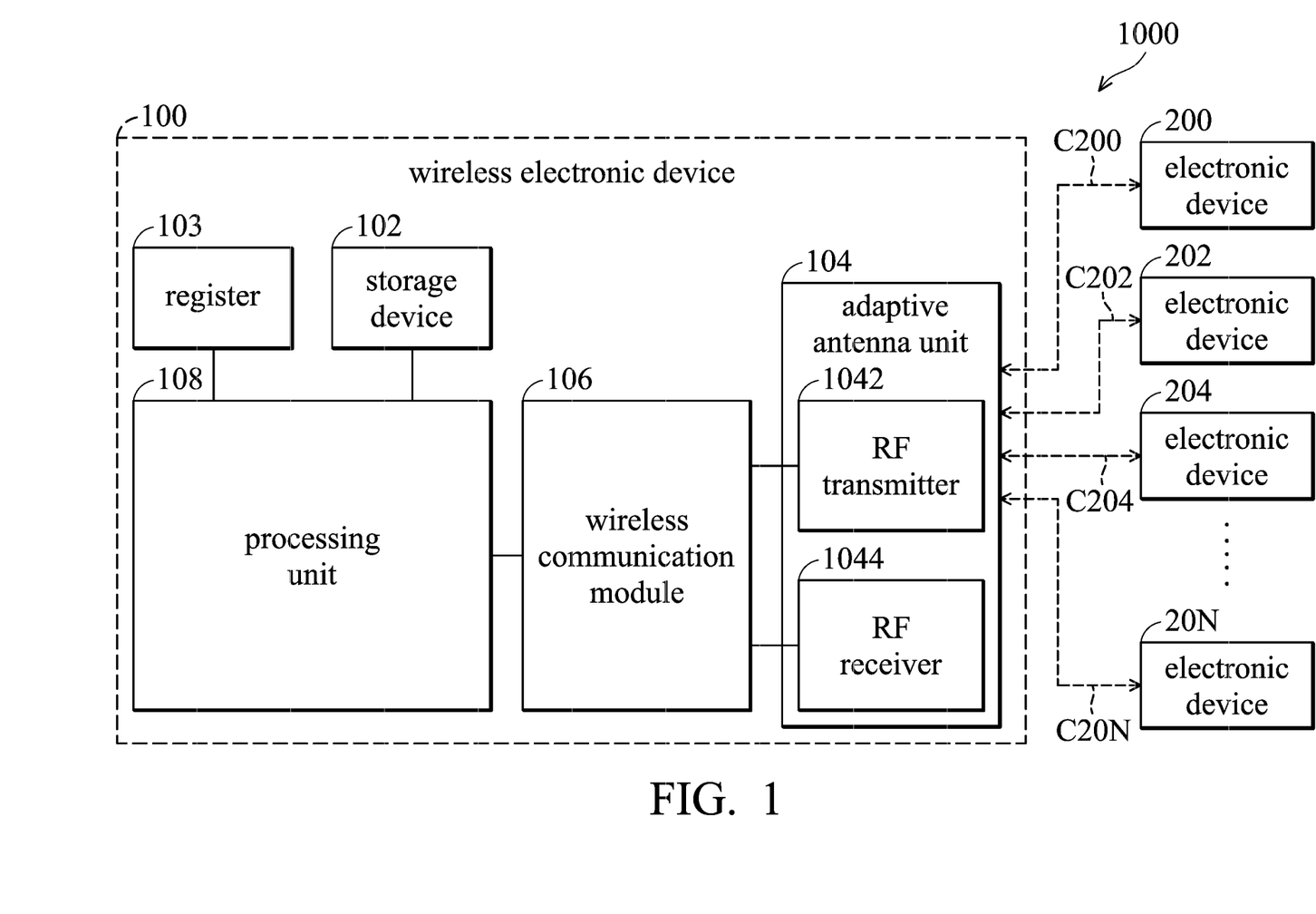
FIG. 1 is a schematic diagram illustrating an embodiment of a wireless electronic system of the present invention.

FIG. 1 is a schematic diagram illustrating an embodiment of a wireless electronic system of the present invention. The wireless electronic system 1000 includes a wireless electronic device 100 and at least one electronic device(s) 200-20N.

The wireless electronic device 100 is arranged to transmit and receive data to/from the electronic device(s) 200-20N by at least one wireless channel(s) C200-C20N. The transmission media of the wireless channels C200-C20N are transmitted through the media of air or other medium capable of transmitting radio waves. It should be noted that, in the present invention, the electronic devices 200-20N can be located at different places. Therefore, the wireless electronic device 100 is arranged to directionally transmit and receive data to and from the electronic devices 200-20N according to the locations of the electronic devices 200-20N, respectively. It should be noted that the wireless electronic device 100 is capable of transmitting and receiving data, directionally, but it is not limited thereto. The wireless electronic device 100 may also be omnidirectional. In one of the present embodiments, the wireless electronic device 100 transmits and receives data by packets, but it is not limited thereto. It should be noted that the wireless electronic device 100 may determine the current wireless parameters corresponding to the electronic devices 200-20N, respectively, according to the packets received form the electronic devices 200-20N. For example, the wireless electronic device 100 determines the current wireless parameters corresponding to the electronic devices 200, respectively, according to the packets received form the electronic device 200 through the wireless channel C200. In one of the embodiments, the wireless parameters may include the packet error rate (PER), the received signal strength indication (RSSI) and/or the TX power, etc. More specifically, the wireless electronic device 100 includes a storage device 102, a register 103, an adaptive antenna unit 104, a wireless communication module 106 and a processing unit 108.

The storage device 102 is arranged to store a plurality of antenna pattern tables, a connection record form, a maintenance database, and an RF transmission period table. Each of the antenna pattern tables is arranged to store the relationship of a plurality of antenna patterns and a plurality of predetermined wireless parameter sets. For example, the processing unit 108 may find a corresponding predetermined wireless parameter set from the antenna pattern tables according to the wireless parameters of the current received packet(s), wherein the processing unit 108 finds the corresponding predetermined wireless parameter set according to the difference between the corresponding predetermined wireless parameter set and the wireless parameters of the current received packet(s), and the difference between the corresponding predetermined wireless parameter set and the wireless parameters of the current received packet(s) is less than a predetermined value. Furthermore, the processing unit 108 provides the antenna pattern corresponding to the corresponding predetermined wireless parameter set to the wireless communication module 106 for enabling the adaptive antenna unit 104. The connection record form is arranged to record the connection addresses of the electronic devices 200-20N connected with the wireless electronic device 100. The maintenance database is arranged to record the wireless parameters of the electronic device(s) connected with the wireless electronic device 100. The RF transmission period table is arranged to store the travel times corresponding to the predetermined wireless parameter set.

The register 103 is arranged to store temporality data. For example, in this embodiment, the register 103 is arranged to store the scan results of the adaptive antenna unit 104, wherein the scan results includes the STA MAC Addresses and wireless parameter sets of each of the electronic devices 200-20N, but it is not limited thereto.

The adaptive antenna unit 104 is arranged to directionally transmit and receive data. More specifically, the wireless communication module 106 is arranged to control the transmission direction of the adaptive antenna unit 104 according to the antenna patterns, wherein each of the antenna patterns corresponds to a wireless channel. For example, the adaptive antenna unit 104 may be an antenna array including a plurality of antennas, and the wireless communication module 106 controls the directions of the antennas of the adaptive antenna unit 104 according to the antenna patterns, but it is not limited thereto. In other embodiments, the adaptive antenna unit 104 may be implemented by a plurality of directional antennas or a reconfigurable antenna, wherein the wireless communication module 106 controls the directions of the directional antennas or the reconfigurable antenna according to the antenna patterns. For example, the adaptive antenna unit 104 forms a fan-shaped field or a circular radiation field on a specific direction for transmitting and receiving data in the specific direction. In one of the embodiments, the adaptive antenna unit 104 includes an RF transmitter 1042 and an RF receiver 1044. The RF transmitter 1042 is arranged to directionally transmit data. The RF receiver 1044 is arranged to directionally receive data.

The wireless communication module 106 is arranged to enable the adaptive antenna unit 104 according to at least one antenna pattern, wherein the antenna pattern is arranged to determine the data transmission direction of the adaptive antenna unit 104, and the data transmissions of the wireless channels C200-C20N are controlled by one of the antenna patterns. Moreover, the wireless communication module 106 is arranged to encode data for transmitting and receiving data to and from the electronic devices 200-20N by the adaptive antenna unit 104 through the wireless channels C200-C20N, and decode the packets of the electronic devices 200-20N received from the wireless channels C200-C20N for transmitting and receiving the decoded data to and from the processing unit 108.

The processing unit 108 may include a central-processing unit (CPU) or a plurality of processing units of a parallel processing environment. Moreover, the processing unit 180 may include a memory. The memory may include a read only memory (ROM), a flash ROM and/or a random access memory (RAM) storing the program codes which are arranged to be performed by the processing unit 108. It should be noted that the memory may also be implemented in the storage device 102 and/or the register 103, but it is not limited thereto.

In one embodiment, the processing unit 108 includes an operation system and modules arranged to manage the wireless parameters, but it is not limited thereto. The processing unit 108 is arranged to enable the adaptive antenna unit 104 to enable the adaptive antenna unit 104 to scan in different directions for obtaining a scan result when the wireless electronic device 100 is turned on. It should be noted that the scan result includes the connection address and the wireless parameter set of at least one capable electronic device. Namely, the processing unit 108 can detect the electronic device(s) capable of connecting the wireless electronic device 100 and the direction(s) of the capable electronic device(s) by the scanning of the adaptive antenna unit 104. Moreover, the processing unit 108 can find the proper antenna pattern(s) from the antenna pattern table responding to the capable electronic device(s), and connect the capable electronic device(s) by the proper antenna pattern(s).

It should be noted that, in one embodiment, the processing unit 108 is further arranged to perform a detection procedure for detecting the types of applications executed by the electronic device(s) connected with the wireless electronic device 100. For example, the processing unit 108 may determine the type of application corresponding to the received packet(s), but it is not limited thereto. The processing unit 108 may be also send a request to the connected electronic device, and the processing unit 108 further determines the type of application executed by the connected electronic device according to the feedback data of the connected electronic device.

Moreover, the processing unit 108 estimates a feedback time for when the wireless electronic device may receive data from the connected electronic device when a predetermined condition is met. The processing unit 108 enables the adaptive antenna unit 104 to form a specific direction on a specific direction of the connected electronic device according to antenna pattern corresponding to the connected electronic device after the feedback time for receiving data through the specific radiation field. It should be noted that, in one embodiment, the processing unit 108 forms the specific radiation field only in a predetermined period after the feedback time. When the adaptive antenna unit 104 does not receive any packets during the predetermined period, the processing unit 108 enables operation system scheduling and periodically forms the specific radiation field after the feedback time intervals.

In one embodiment, the processing unit 108 determines whether the predetermined condition is met according to the requirement of the network connection of the application(s) executed by the connected electronic device, but it is not limited thereto. More specifically, the processing unit 108 determines that the predetermined condition is met if the application is an interactive application. For, example, the interactive application may be an instant messaging application or a search application which require frequently packet exchanging, and the one-to-one or one-to-many video playback application does not belong to this type of interactive application. Moreover, the processing unit 108 determines the feedback time according to the wireless parameter set of the connected electronic device, wherein the interval of the feedback time is one of the travel times stored in the RF transmission period table, but it is not limited thereto. For example, the processing unit 108 is arranged to match the received wireless parameter set with the predetermined wireless parameter sets stored in the RF transmission period table to find the corresponding predetermined wireless parameter set, wherein the difference of the corresponding predetermined wireless parameter set and the received wireless parameter set is less than a predetermined value. Next, the processing unit 108 finds the corresponding travel time according to the corresponding predetermined wireless parameter set, and determines the feedback time according to the corresponding travel time, but it is not limited thereto.

When the predetermined condition is not met, the processing unit 108 enables the adaptive antenna unit 104 to form an omnidirectional radiation field by an omnidirectional antenna pattern for receiving data form the omnidirectional radiation field.

When the processing unit 108 receives a data segment through the specific radiation field or the omnidirectional radiation field, the processing unit 108 determines whether the data segment is received from a first electronic device (one of the electronic devices 200-20N) corresponding to the estimated feedback time. When the data segment is received from the first electronic device, the processing unit 108 is further arranged to send the data segment to the network protocol layer to be processed. When the data segment is not received from the first electronic device, the processing unit 108 is further arranged to determine whether the data segment is a general management pack.

When the data segment is a general management pack, the processing unit 108 enables operation system scheduling to process the general management pack. When the data segment is not the general management pack, the processing unit 108 is further arranged to enable the wireless communication module 106 to form the specific radiation field after the next feedback time for receiving data through the specific radiation field, but it is not limited thereto.

In another embodiment, when the data segment is a general management pack, the processing unit 108 enables operation system scheduling to process the received data segment. When the data segment is not the general management pack, the processing unit 108 is further arranged to determine whether the data segment is received from another application executed by other electronic devices. When the data segment is received from another application executed by other electronic devices, the processing unit 108 is further arranged to send the data segment to a network protocol layer to be processed. When the data segment is not received from another application executed by other electronic devices, the processing unit 108 enables the wireless communication module 106 to enable the adaptive antenna unit 104 to form the specific radiation field after the next feedback time for receiving data through the specific radiation field.

Moreover, the processing unit 108 also includes a self-learning module arranged to perform a self-learning process according to the received wireless parameter set to dynamically maintain and update the antenna pattern table and the RF transmission period table when the connection environment changes. It should be noted that, in one of the present embodiments, a group of predetermined wireless parameter sets and corresponding travel times are pre-stored in the RF transmission period table before the self-learning process performed. Moreover, the processing unit 108 may dynamically maintain the RF transmission period table when there is no proper travel time matched to the received wireless parameter set in the RF transmission period table. For example, the processing unit 108 may calculate the distance between the electronic device corresponding to the received wireless parameter set and the wireless electronic device 100 by a function stored in the storage device 102, according to the physical laws of radio waves and the received wireless parameter set, and estimate the travel time of data according to the distance of the wireless electronic device 100 and the electronic device corresponding to the received wireless parameter set. Furthermore, the processing unit 108 stores the estimated travel time and the corresponding wireless parameter set in the RF transmission period table, but it is not limited thereto.

It should be noted that, when the connected electronic device executes a plurality of applications requiring network connection, the predetermined condition is not met when one of the applications is not an interactive application.

Figure 2:
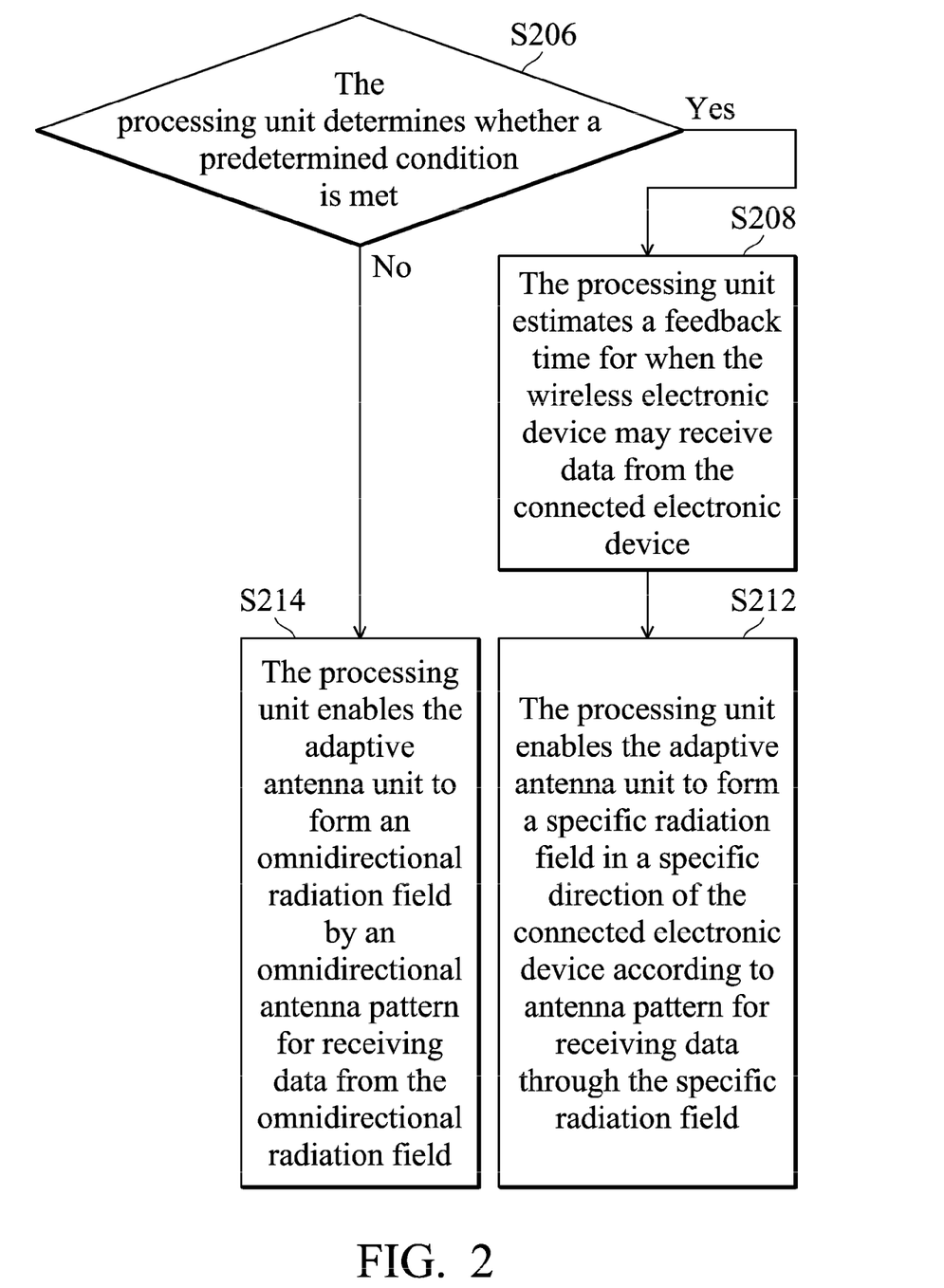
FIG. 2 is a flow chart illustrating an embodiment of a wireless transmission method of the present invention.

FIG. 2 is a flow chart illustrating an embodiment of a wireless transmission method of the present invention. The wireless transmission method is applied to the wireless electronic device 100 of FIG. 1. The process starts at step S206.

In step S206, the processing unit 108 determines whether a predetermined condition is met. When the predetermined condition is met, the process goes to step S208, otherwise, the process goes to step S214. In one embodiment, the processing unit 108 determines whether the predetermined condition is met according to the requirements of the network connection of the application(s) being run by the connected electronic device, but it is not limited thereto. More specifically, the processing unit 108 determines that the predetermined condition is met if the application is an interactive application. For, example, the interactive application may be an instant messaging application or a search application which require frequent packet exchanging, and the one-to-one or one-to-many video playback application does not belong to the type of interactive application.

Next, In step S208, the processing unit 108 estimates a feedback time for when the wireless electronic device may receive data from the connected electronic device, wherein the interval of the feedback time is one of the travel times stored in the RF transmission period table, but it is not limited thereto. For example, the processing unit 108 is arranged to match the received wireless parameter set with the predetermined wireless parameter sets stored in the RF transmission period table to find the corresponding predetermined wireless parameter set, wherein the difference of the corresponding predetermined wireless parameter set and the received wireless parameter set is less than a predetermined value. Next, the processing unit 108 finds the corresponding travel time according to the corresponding predetermined wireless parameter set, and determines the feedback time according to the corresponding travel time, but it is not limited thereto.

Next, In step S212, the processing unit 108 enables the adaptive antenna unit 104 to form a specific radiation field in a specific direction of the connected electronic device according to antenna pattern corresponding to the connected electronic device after the feedback time for receiving data through the specific radiation field. It should be noted that, in one embodiment, the processing unit 108 forms the specific radiation field only in a predetermined period after the feedback time. When the adaptive antenna unit 104 does not receive any packet during the predetermined period, the processing unit 108 enables operation system scheduling and periodically forms the specific radiation field after the feedback time intervals. The process ends at step S212.

In step S214, the processing unit 108 enables the adaptive antenna unit 104 to form an omnidirectional radiation field by an omnidirectional antenna pattern for receiving data from the omnidirectional radiation field. The process ends at step S214.

Figure 3A:
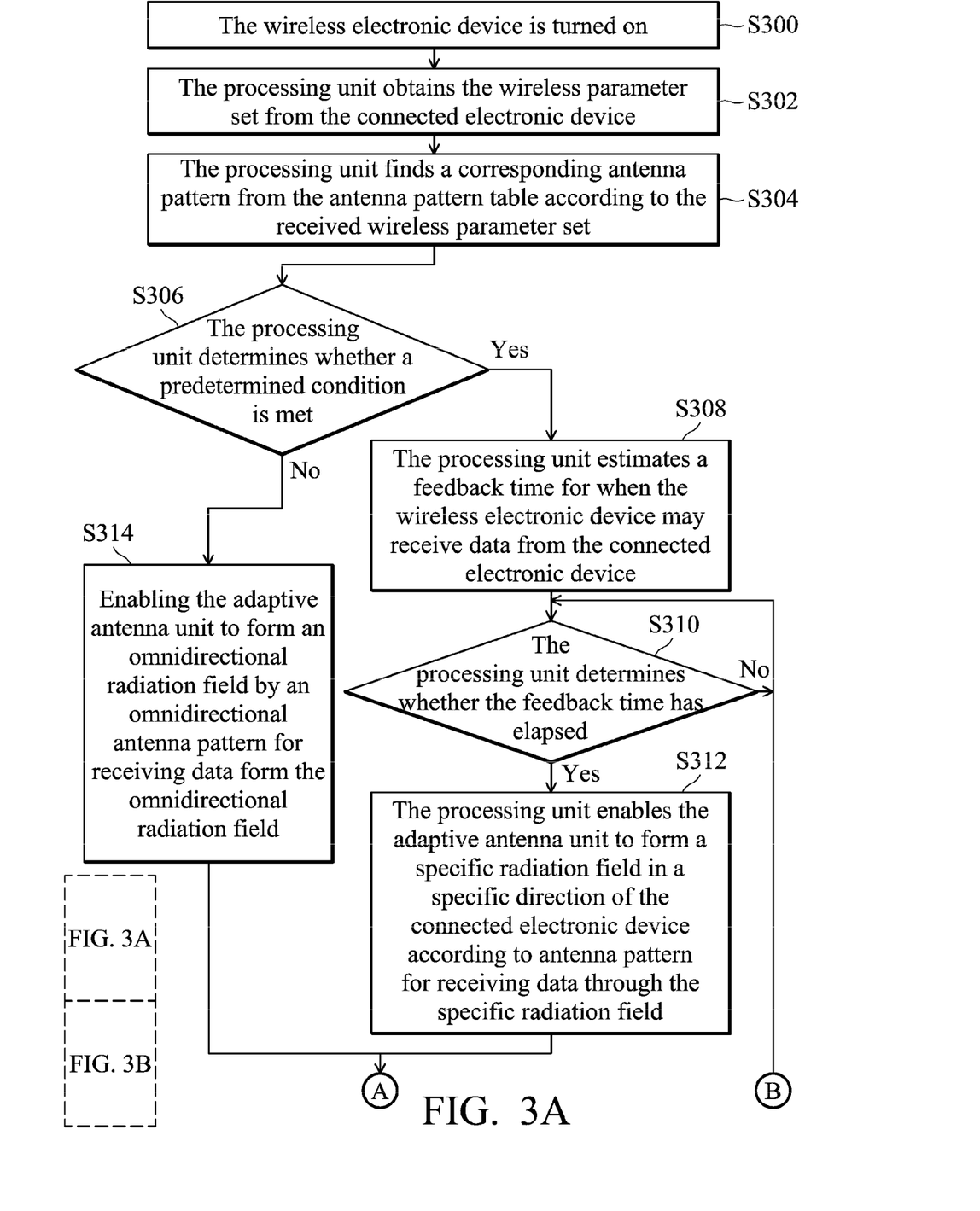
FIG. 3A-3B are a flow chart illustrating another embodiment of the wireless transmission method of the present invention.
Figure 3B:
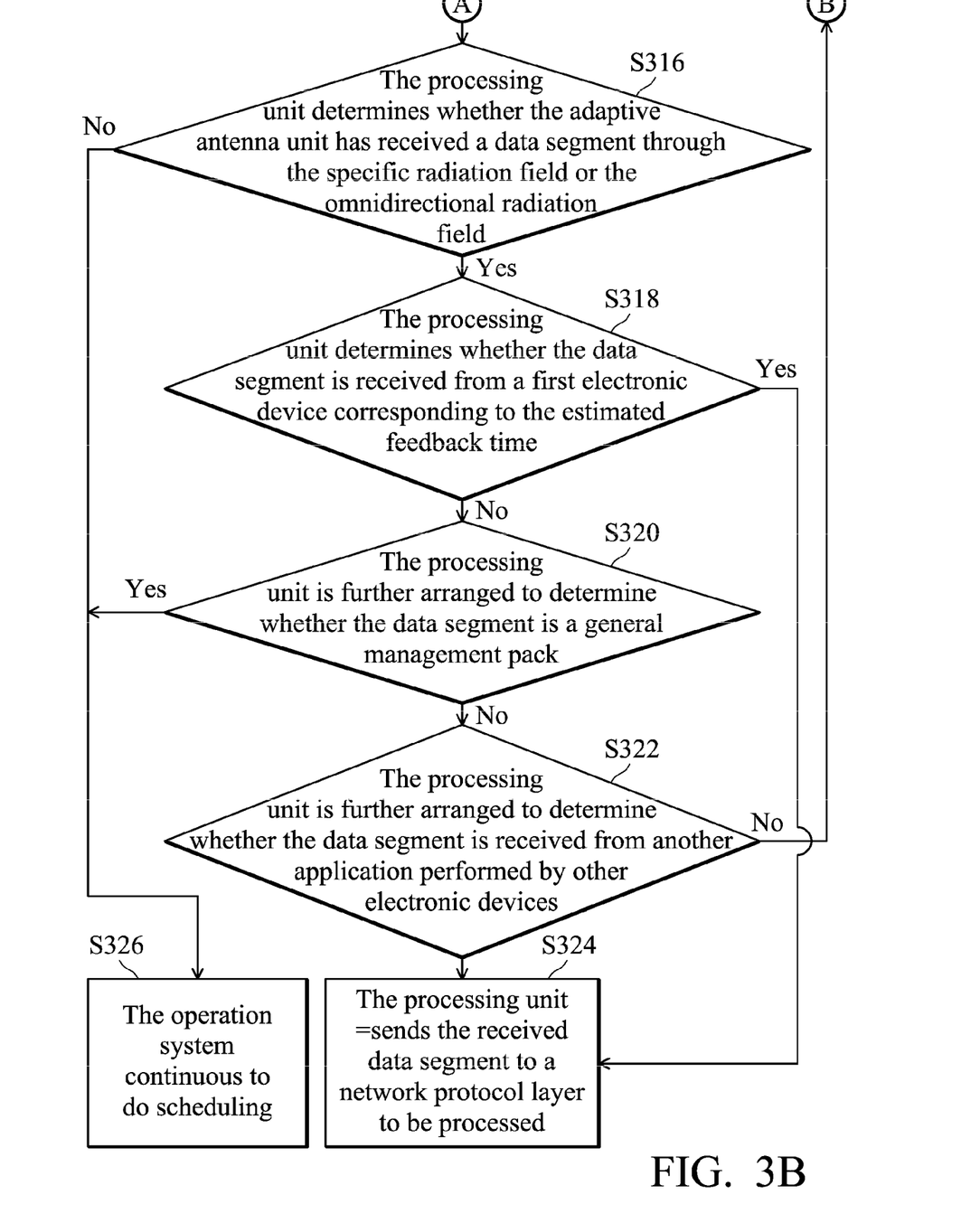

FIG. 3A-3B is a flow chart illustrating another embodiment of the wireless transmission method of the present invention. The wireless transmission method is applied to the wireless electronic device 100 of FIG. 1. The process starts at step S300. It should be noted that steps S306, S308 and S314 are similar to steps S206, S208 and S214. The details of steps S306, S308 and S314 can be referred to steps S206, S208 and S214.

In step S300, the wireless electronic device 100 is turned on, and the processing unit 108 performs the self-learning module and the detection procedure. The self-learning module is arranged to perform a self-learning process according to the received wireless parameter set to dynamically maintain and update the antenna pattern table and the RF transmission period table when the connection environment changes. The detection procedure is arranged to detect the types of applications executed by the electronic device(s) connected with the wireless electronic device 100. For example, the processing unit 108 may determine the type of the application corresponding to the received packet(s), but it is not limited thereto. The processing unit 108 may also send a request to the connected electronic device, and determine the type of the application executed by the connected electronic device according to the feedback data of the connected electronic device.

Next, In step S302, the processing unit 108 obtains the wireless parameter set from the connected electronic device. For example, the processing unit 108 enables the adaptive antenna unit 104 to perform scanning in different directions for obtaining a scan result. It should be noted that the scan result includes the connection address and the wireless parameter set of at least one capable electronic device. Namely, the processing unit 108 can detect the electronic device(s) capable of connecting the wireless electronic device 100 and the direction(s) of the capable electronic device(s) by the scanning of the adaptive antenna unit 104.

In step S304, the processing unit 108 finds a corresponding antenna pattern from the antenna pattern table according to the received wireless parameter set corresponding to the capable electronic device and connects the capable electronic device.

Next, In step S310, the processing unit 108 determines whether the feedback time has elapsed. When the feedback time has elapsed, the process goes to step S312, otherwise, the processing unit 108 continuous to determine whether the feedback time has elapsed.

In step S312, the processing unit 108 enables the adaptive antenna unit 104 to form a specific radiation field in a specific direction of the connected electronic device according to antenna pattern corresponding to the connected electronic device after the feedback time for receiving data through the specific radiation field. It should be noted that, in one embodiment, the processing unit 108 forms the specific radiation field only in a predetermined period after the feedback time. When the adaptive antenna unit 104 does not receive any packet during the predetermined period, the processing unit 108 enables operation system scheduling and periodically forms the specific radiation field after the feedback time intervals.

In step S316, the processing unit 108 determines whether the adaptive antenna unit 104 has received a data segment through the specific radiation field or the omnidirectional radiation field. When the adaptive antenna unit 104 has received the data segment through the specific radiation field or the omnidirectional radiation field, the process goes to step S318, otherwise, the process goes to step S328.

In step S318, the processing unit 108 determines whether the data segment is received from a first electronic device corresponding to the estimated feedback time. When the data segment is received from the first electronic device, the process goes to step S324, otherwise, the process goes to step S320.

In step S320, the processing unit 108 is further arranged to determine whether the data segment is a general management pack. When the data segment is a general management pack, the process goes to step S326, otherwise, the process goes to step S322.

In step S322, the processing unit 108 is further arranged to determine whether the data segment is received from another application executed by other electronic devices. When the data segment is received from another application executed by other electronic devices, the process goes to step S324, otherwise, the step returns to step S310 to periodically form the specific radiation field for receiving data.

In step S324, the processing unit 108 sends the received data segment to a network protocol layer to be processed. The process ends at step S324.

In step S326, the operation system continuous to do scheduling. The process ends at step S326.

The wireless electronic device 100 and the wireless transmission method of the present invention may receive data directionally.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless electronic device, comprising:
   an adaptive antenna unit, arranged to directionally receive data from a first electronic device; and
   a processing unit, arranged to estimate a feedback time for when the wireless electronic device may receive data from the first electronic device when a predetermined condition is met, and enable the adaptive antenna unit to form a specific radiation field in a specific direction to receive data through the specific radiation field after the feedback time.

2. The wireless electronic device as claimed in claim 1, wherein the processing unit is arranged to determine whether the predetermined condition is met according to at least one application, wherein the application is executed by the first electronic device and requires network connection.

3. The wireless electronic device as claimed in claim 2, wherein the processing unit determines that the predetermined condition is met when the application is an interactive application.

4. The wireless electronic device as claimed in claim 1, wherein the processing unit is arranged to estimate the feedback time according to a wireless parameter set received from the first electronic device when the predetermined condition is met.

5. The wireless electronic device as claimed in claim 4, further comprising a storage device arranged to store an RF transmission period table, wherein the RF transmission period table is arranged to store a plurality of predetermined wireless parameter sets and a plurality of travel times corresponding the predetermined wireless parameter sets, respectively, and the processing unit is arranged to match the received wireless parameter sets with the predetermined wireless parameter sets stored in the RF transmission period table to find the corresponding travel time and determine the feedback time according to the corresponding travel time.

6. The wireless electronic device as claimed in claim 5, wherein the processing unit is further arranged to maintain the RF transmission period table dynamically according to the received wireless parameters.

7. The wireless electronic device as claimed in claim 1, wherein the processing unit is arranged to enable the adaptive antenna unit to form a omnidirectional radiation field to receive data through the omnidirectional radiation field when the predetermined condition is not met.

8. The wireless electronic device as claimed in claim 7, wherein when the processing unit receives a data segment through the specific radiation field or the omnidirectional radiation field, the processing unit is further arranged to determine whether the data segment is received from the first electronic device, and the processing unit sends the data segment to a network protocol layer to be processed when the data segment is received from the first electronic device.

9. The wireless electronic device as claimed in claim 8, wherein when the data segment is not received from the first electronic device, the processing unit is further arranged to determine whether the data segment is a general management pack.

10. The wireless electronic device as claimed in claim 9, wherein the processing unit enables operation system scheduling when the data segment is the general management pack, and enables the wireless communication module to enable the adaptive antenna unit to form the specific radiation field after the next feedback time for receiving data through the specific radiation field when the data segment is not the general management pack.

11. The wireless electronic device as claimed in claim 9, wherein the adaptive antenna unit is further arranged to receive data from at least one second electronic device, wherein the processing unit enables operation system scheduling when the data segment is the general management pack, and determines whether the data segment is data of another application received from the second electronic device when the data segment is not the general management pack, sends the data segment to the network protocol layer to be processed when the data segment is received from the second electronic device, and the processing unit enables the wireless communication module to enable the adaptive antenna unit to form the specific radiation field after the next feedback time interval for receiving data through the specific radiation field when the data segment is not received from the second electronic device.

12. A wireless transmission method, applied to an adaptive antenna unit of a wireless electronic device, wherein the adaptive antenna unit is arranged to directionally receive data from a first electronic device, and the wireless transmission method comprises:
determining whether a predetermined condition is met;
estimating a feedback time for when the wireless electronic device may receive data from the first electronic device when the predetermined condition is met; and
enabling the adaptive antenna unit to form a specific radiation field on a specific direction to receive data through the specific radiation field after the feedback time.

13. The wireless transmission method as claimed in claim 12, wherein step of determining whether the predetermined condition is met further comprises determining whether the predetermined condition is met according to at least one application, wherein the application is executed by the first electronic device and requires network connection.

14. The wireless transmission method as claimed in claim 13, wherein step of determining whether the predetermined condition is met further comprises determining that the predetermined condition is met when the application is an interactive application.

15. The wireless transmission method as claimed in claim 12, wherein step of estimating the feedback time further comprises estimating the feedback time according to a wireless parameter set received from the first electronic device.

16. The wireless transmission method as claimed in claim 15, wherein step of estimating the feedback time further comprises matching the received wireless parameter set with a plurality of predetermined wireless parameter sets stored in an RF transmission period table to find a corresponding travel time and determining the feedback time according to the corresponding travel time, wherein the RF transmission period table is arranged to store the predetermined wireless parameter sets and a plurality of travel times corresponding the predetermined wireless parameter sets.

17. The wireless transmission method as claimed in claim 16, further comprising maintaining the RF transmission period table dynamically according to the received wireless parameters.

18. The wireless transmission method as claimed in claim 12, further comprising enabling the adaptive antenna unit to form an omnidirectional radiation field to receive data through the omnidirectional radiation field when the predetermined condition is not met.

19. The wireless transmission method as claimed in claim 18, further comprising:
determining whether a data segment is received from the first electronic device when receiving the data segment through the specific radiation field or the omnidirectional radiation field; and
sending the data segment to a network protocol layer to be processed when the data segment is received from the first electronic device.

20. The wireless transmission method as claimed in claim 19, further comprising determining whether the data segment is a general management pack when the data segment is not received from the first electronic device.

21. The wireless transmission method as claimed in claim 20, further comprising:
enabling operation system scheduling when the data segment is the general management pack; and
enabling the wireless communication module to enable the adaptive antenna unit to form the specific radiation field after the next feedback time for receiving data through the specific radiation field when the data segment is not the general management pack.

22. The wireless transmission method as claimed in claim 20, wherein the adaptive antenna unit is further arranged to receive data from at least one second electronic device, and the wireless transmission method further comprises:

enabling operation system scheduling when the data segment is the general management pack;
determining whether the data segment is data of another application received from the second electronic device when the data segment is not the general management pack;
sending the data segment to the network protocol layer to be processed when the data segment is received from the second electronic device; and
enabling the wireless communication module to enable the adaptive antenna unit to form the specific radiation field after the next feedback time interval for receiving data through the specific radiation field when the data segment is not received from the second electronic device.

* * * * *